United States Patent
Cao et al.

(10) Patent No.: US 6,721,269 B2
(45) Date of Patent: *Apr. 13, 2004

(54) APPARATUS AND METHOD FOR INTERNET PROTOCOL FLOW RING PROTECTION SWITCHING

(75) Inventors: Yang Cao, Bradford, MA (US); William M. Buchanan, Rockingham, NH (US); Stephen George Lefoley, Plaistow, NH (US)

(73) Assignee: Lucent Technologies, Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 27 days.

(21) Appl. No.: 09/318,694

(22) Filed: May 25, 1999

(65) Prior Publication Data

US 2002/0181485 A1 Dec. 5, 2002

(51) Int. Cl.$^7$ .................... G01R 31/08; H04L 12/28
(52) U.S. Cl. .................. 370/227; 370/244; 370/410; 370/389
(58) Field of Search ................. 370/225, 216, 370/217, 227, 228, 218, 221, 400, 238, 242, 248, 238.1, 249, 406; 359/115, 117, 123, 124, 128; 709/241, 242, 238, 239

(56) References Cited

U.S. PATENT DOCUMENTS

| | | | | |
|---|---|---|---|---|
| 5,307,342 A | * | 4/1994 | Georigiou et al. | 359/115 |
| 5,835,482 A | * | 11/1998 | Allen | 370/225 |
| 5,881,243 A | * | 3/1999 | Zaumen et al. | 370/238 |
| 5,959,972 A | * | 9/1999 | Hamami | 370/228 |
| 6,047,331 A | * | 4/2000 | Medard et al. | 709/239 |
| 6,111,673 A | * | 8/2000 | Chang et al. | 359/123 |
| 6,272,107 B1 | * | 8/2001 | Rochberger et al. | 370/216 |
| 6,311,288 B1 | * | 10/2001 | Heeren et al. | 370/225 |
| 6,324,162 B1 | * | 11/2001 | Chaudhri | 370/225 |

* cited by examiner

Primary Examiner—Hassan Kizou
Assistant Examiner—Hanh Nguyen

(57) ABSTRACT

A router in accordance with the principles of the present invention employs explicit routing protocols to establish a plurality of explicitly routed label switched paths between source and sink routers. The sink router selects one of these explicitly routed paths as a primary path and communicates along that path. Upon a failure in a path selected as a primary path, a secondary path is instantaneously selected as the new primary path. Since the new route has already been established, there is no need to re-compute the path at the time of a failure. Consequently, a new path is rapidly established in response to the failure of a path. One of the new routers may employ physical level maintenance information, such as loss of signal (LOS) or loss of pointer (LOP), for example, to detect such path failures. Additionally, the new router may employ provisioned flow information to propagate path failure alarms.

23 Claims, 4 Drawing Sheets

| | ERLSP ID | INCOMING LABEL | OUTGOING LABEL | NEXT HOP | OUTGOING INTERFACE | PROTECTION STATUS |
|---|---|---|---|---|---|---|
| LSR S | 1 | 10 | 100 | A | if0 | 1 |
| LSR S | 2 | 10 | 17 | C | if1 | 1 |
| LSR A | 1 | 100 | 6 | B | if1 | 0 |
| LSR B | 1 | 6 | 6 | E | if2 | 0 |
| LSR C | 1 | 17 | 5 | D | if0 | 0 |
| LSR D | 1 | 5 | 6 | E | if2 | 2 |
| LSR E | 1 | 6 | | | | |
| LSR E | 2 | 6 | | | | 3 |

|  | ERLSP ID | INCOMING LABEL | OUTGOING LABEL | NEXT HOP | OUTGOING INTERFACE | PROTECTION STATUS |
|---|---|---|---|---|---|---|
| LSR S | 2 | 10 | 17 | C | if1 | 0 |
| LSR C | 1 | 17 | 5 | D | if2 | 0 |
| LSR D | 1 | 5 | 6 | E | if0 | 0 |
| LSR E | 2 | 6 | | | if2 | 0 |

FIG. 6

APPARATUS AND METHOD FOR INTERNET PROTOCOL FLOW RING PROTECTION SWITCHING

FIELD OF THE INVENTION

The invention relates to communications networks and, more particularly, to switches and routers for communications networks that employ the TCP/IP Internet protocol suite.

BACKGROUND OF THE INVENTION

Communications networks, such as local area network (LAN), wide area networks (WAN), and the Internet, support an increasing number services. For example, voice, facsimile, and video services have been added to traditional packet-based services. Many TCP/IP applications on such multi-service networks rely upon the IP layer for transport. Although the reliability and speed of such networks was adequate for traditional packet-based traffic, the delivery of voice, facsimile and video information typically requires a higher level of reliability and, in the event of a failure, more rapid recovery from a failure than is generally available from a conventional TCP/IP communications network. Optimized for spare link efficiency and topological flexibility, such conventional IP networks rely upon best-effort packet delivery. Improved reliability is required for TCP/IP applications that rely on the IP layer for transport. However, packet level granularity, connectionless based transport, and hop-by-hop routing all conspire to expand the IP restoration time to something on the order of tens of seconds or even minutes. An interruption of this length can prove very costly in any of the new applications. That is, an interruption of only half a second during a telephone conversation can be very annoying, the seconds-long loss of a video signal during a football game may obscure a critical touchdown (or non-touchdown called as a touchdown), and the loss of seconds from a facsimile signal could require re-sending the facsimile. Such performance limitations may preclude the acceptance TCP/IP networks for the delivery of various such applications.

Compared to connection-oriented protection approaches, such as SONET, IP restoration is slow and unpredictable. Typically, IP compliant communications networks include a plurality of paths between IP routers or switches (for the sake of clarity, the term "routers" will be used hereinafter to describe both routers and switches). The routers select among the various paths to form a circuit that permits the delivery of signals from an entry point to an exit point within the network. When one of the selected paths fails, the failure must be detected, the fault information must be propagated so that all the affected circuits may be reconfigured, and, finally, the appropriate response, re-routing of the circuits, must be computed and effected. This three-step process may require minutes to complete. Although upper layer protocols and applications, such as TCP retransmission, sufficiently addresses reliability problems for conventional packet-based applications, IP restoration is too slow and unpredictable for the voice, video, fax, or virtual private network applications which otherwise might employ IP networks as a multi-service backbone.

A TCP/IP communications network that provides rapid restoration, thereby permitting the use of such networks for the reliable, readily restored transmission of voice, video, fax, or virtual private network signals would therefore be highly desirable.

SUMMARY

A router in accordance with the principles of the present invention employs explicit routing protocols to establish a plurality of explicitly routed paths between source and sink routers. The sink router selects one of these explicitly routed paths as a primary path and communicates along that path. Upon a failure in a path selected as a primary path, a secondary path is instantaneously selected as the new primary path. Since the new route has already been established, there is no need to compute the path at this at this time-sensitive juncture. One of the new routers may employ physical level maintenance information, such as loss of signal (LOS) or loss of pointer (LOP), for example, to detect such path failures. In another aspect of the invention, the new router may employ provisioned flow information in order to propagate failure information.

A router in accordance with the principles of the present invention may be employed to establish one or more circuit paths among a plurality of routers. Rather than establishing a hop-to-hop path in order to permit the transmission of signals along a circuit, a router in accordance with the principles of the invention operates as an explicitly routed line switched router (ERLSP) to establish a plurality of paths from a source (entry) router to a sink (destination) router. The paths are provisioned at the source router, through a network management system, for example, which may, in accordance with the principles of the present invention, ensure that the paths are disjoint. All of the new routers between the source and sink routers operate to establish the plurality of paths. In the event of a path failure, the sink router selects an operational one of the pre-established paths. Additionally, in order to accommodate a failure in the newly selected path, the sink and source nodes may establish another path back to the source router to maintain the desired redundancy and the secondary (and ternary, etc.) path(s) may also be monitored for failure so that they may be replaced in the event of their failure.

That is, a relatively simple network implementation in accordance with the principles of the invention may entail the establishment of a primary path and secondary, or backup, path for each router in the network. This concept may be extended to include a plurality of primary paths, with one or more secondary paths for each of the primary paths. An operations control center may provision each of the routers with the number and type (that is, primary or secondary) of each path. Multiple secondary paths would accommodate multiple failures, but at the price of more complexity in the provisioning and in the operation of the protection scheme. Regardless of the number of primary and secondary paths, in accordance with the principles of the invention a failure may be detected through physical layer indicators in a primary path. In response to the physical layer failure indication, the failure is propagated and the exit router selects an alternative, previously established, path for immediate use.

A router in accordance with the principles of the invention may employ physical level maintenance information for failure detection. In a network that provides maintenance information, such as SONET fault indicators like loss of signal (LOS), loss of pointer (LOP), a router in accordance with the principles of the present invention may employ such indicators to determine when a routing path has failed. Because the physical level maintenance information indicating a failure is typically available to routers much more rapidly than conventional path failure indications, a communications system which employs one of the new routers may be alerted to path failures more rapidly than conventional routers.

Additionally, a router in accordance with the principles of the invention may employ provisioned flow information in order to propagate failure information. By propagating the failure information in this manner, rather than by a conventional approach, which encounters hop-by-hop routing delays, a communications system may propagate failure information more quickly than conventional routers would allow.

The IP flow ring protection switching mechanism provided by a router in accordance with the principles of the present invention can provide restoration in substantially less time than that required for conventional IP restoration mechanisms. Additionally, because a router in accordance with the principles of the present invention operates at the physical layer, it is independent of link layer protocols. Consequently, the router, and network systems which employ it, automatically support asynchronous transfer mode (ATM), frame relay (FR) and point-to-point (PPP) protocols.

A router in accordance with the principles of the present invention, and IP flow rings employing such a router, employ explicit routing algorithms to establish a plurality of explicitly routed circuit paths. The sink router chooses one of these paths as the primary path and communicates along this primary path unless the primary path fails. If the primary path fails, the sink router switches to communications over the secondary path. In those systems where physical or link level maintenance information is available, all the routers along the explicitly routed paths may monitor this information to quickly detect any path failures. For example, in a SONET-based system the routers may employ SONET fault indicators to detect path failures. If such a failure is detected, the router that first detects the failure propagates this information to the source and sink routers. The failure information may be propagated, for example, through provisioned flow information. When the source and sink routers are alerted to the path failure, the sink router switches to the secondary path for communications. The source router may then establish another explicitly routed communications path to act as a new secondary path.

The routers along the secondary path may also monitor the path, and propagate failure information, as described above, so that the source and sink routers may establish another secondary path in the event of a secondary path failure.

BRIEF DESCRIPTION OF THE DRAWINGS

The above and further features, aspects, and advantages of the invention will be apparent to those skilled in the art from the following detailed description, taken together with the accompanying drawings in which:

FIG. 6 is a conceptual block diagram of a label information base table in accordance with the principles of the invention that has been modified in response to a path failure.

DETAILED DESCRIPTION

Conventional TCP/IP networks typically allow for the establishment of any one of many possible paths between IP routers, but routers select only on path as a primary path. When that path fails, the routers exchange information to establish an alternative path. Failure detection in such conventional networks is based on "reachability" information from the routing protocol. Execution of these routing protocols requires a great deal of time, on the order of seconds or minutes. Failure also requires an inordinate amount of time, since failure propagation occurs by hop-by-hop routing. In order to restore service, muting algorithms require additional time to compute and connect new routes around the affected path(s).

In contrast, a router in accordance with the principles of the present invention employs explicit routing protocols to establish a plurality of explicitly routed paths between source (entry) and sink (destination) routers. The sink router selects one of these explicitly routed paths as the primary path and communicates along that path. Upon a failure in a path selected as a primary path, a secondary path is instantaneously selected as the new primary path. Since the new route is already established, and data is already flowing to the sink router along the secondary path, a path need not be computed, and, consequently the time that conventional TCP/IP networks devote to computing a recovery route and establishing a new connection is substantially eliminated. Additionally, one of the new routers may employ physical level maintenance information to detect such path failures. Such physical level maintenance information may be provided by an underlying system, such as a SONET system, and may include fault indicators like loss of signal (LOS) or loss of pointer (LOP), for example. In this manner, that is, using physical or link level fault indicators, a network system that employs the new router may substantially reduce the amount of time required to detect a path failure. And, a new router may employ provisioned flow information in order to propagate failure information; thereby avoiding the hop-by-hop routing delays encountered by conventional TCP/IP networks. As a result of the time savings that may be obtained using any one or a combination of the above techniques, the time to detect a path failure, propagate the path failure information, and respond to the failure, may be reduced from something on the order of minutes, to milliseconds.

Figure 1:
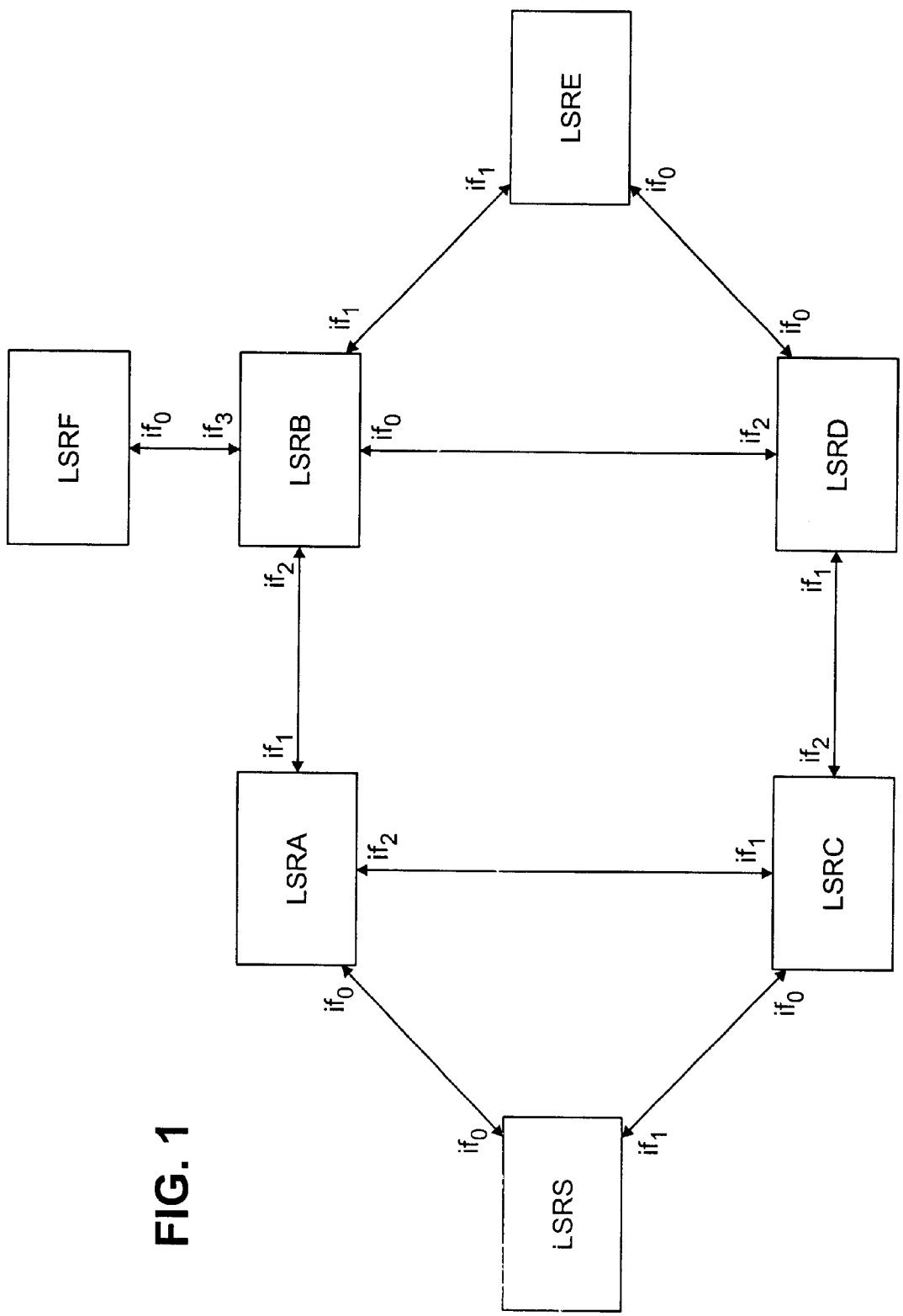
FIG. 1 is a conceptual block diagram of an explicitly routed label switched communications system in accordance with the principles of the present invention.

The conceptual block diagram of FIG. 1 illustrates a multiprotocol label switched routing communications system that employs a router in accordance with the principles of the present invention. The communications system includes label switching routers (LSRs) LSR A, B, C, D, E, F and S. Each of the routers may be an abstract router; that is, it may actually be any one of a plurality of routers within a network in accordance with the principles of the present invention communications from node S to node E may be established employing a plurality of explicit label switched routing paths (ELSRPs) between nodes S and E. Explicit label switched routing paths are known, and discussed, for example, in a Multiprotocol Label Switched Working Group Internet Draft document entitled "Constraint-Based LSP Setup Using LDP", which is hereby incorporated by reference. This, and other Internet draft documents are listed at http:/www.ietf.org/ietf/1id-abstracts.txt In general terms, an explicitly routed path may be established by an ingress router sending a request downstream for an explicit route to a specific egress router and, once the egress router has been reached, the egress router returns an acknowledgement of the request. Priority levels may be employed to insure that, once the explicit path has been established, it is not disrupted by other traffic. Commands are available for the release of the routers along the explicitly routed path once the transmission for which the ingress router requested the explicitly routed path has completed. In accordance with the principles of the invention, the ingress router will establish a plurality of at least partially distinct, that is to say, non-overlapping, explicitly routed paths between itself and the target egress router. By at least partially distinct paths, we mean that each ERLSP will use at least one router that is different than that employed by other ERLSP(s) for at least one "hop". In the example of FIG. 1 LSR S, the ingress router, requests an explicitly routed path between itself and LSR E. As will be explained in greater detail in the discussion related to FIGS. 3 through 6 the ingress router combines the contents of an IP forwarding table with forwarding equivalence class-to-label mappings to produce a label information base in accordance with the principles of the present invention. The label information base may be organized, for example, into a label information base table. The forwarding equivalence class to next hop mapping table may be produced by network layer routing protocols such as Open Shortest Path First (OSPF) or Border Gateway Protocol (BGP).

Internet protocol routing is known and discussed, for example, in Douglas E Comer, Internetworking With TCP/IP Volume I, 1995, Prentiss Hall, pages 109 through 121, which is hereby incorporated by reference. In general terms, indirect delivery, that is delivery of a datagram between two machines that are not directly connected together across a single physical network, employs an Internet Protocol (IP) routing table resident on each host or router in the Internet. The IP routing table stores information about possible destinations and how to reach those destinations. The pertinent routing information typically includes the destination's network prefix, not destination host machine or the corresponding full IP address, and the IP address of the "next" router along the path to the destination network. In accordance with the principles of the invention, a plurality of explicitly routed label switched paths, paths S-A-B-E, and S-C-D-E in the example of FIG. 1, are established from the ingress router, that is, router S, to the egress router, router E. Once both paths are established, datagrams are transmitted along both paths, with the egress router choosing the one of the paths as its primary source of datagrams. Should the primary path fail, due, for example to a cut fiber along the S-A-B-E path, router E switches to a secondary route, the S-C-D-E route in this example. In accordance with the principles of the invention, Label Distribution Protocol (LDP) may be employed to support the establishment of a label switched path (LSP), based on explicit routing constraints. Explicit routing constraints provide an end-to-end setup mechanism, including a way of reserving resources using the label distribution protocol of a constraint-based routed LSP (CRLSP) initiated by the ingress LSR.

Explicit Routing is a subset of the more general constraint-based routing where the constraint is the explicit route. An explicit route is represented in a Label Request Message as a list of nodes or groups of nodes along the constraint-based route. When the CRLSP is established, all or a subset of the nodes in a group may be traversed by the LSP. Certain operations to be performed along the path can also be encoded in the constraint-based route. A constraint-based route is encoded as a series of ER-Hops contained in a constraint-based route Type Length and Value (TLV). Each ER-Hop may identify a group of nodes in the constraint-based route. Consequently, a constraint-based route is a path including all of the identified groups of nodes. For the clarity of exposition, each group of nodes may be referred to hereinafter as an abstract node. A request at an ingress LSR to setup a CRLSP might originate from a management system or an application, for example. The ingress LSR uses information provided by the management system or the application and possibly also information from the routing database to calculate the explicit route and to create a Label Request Message.

A Label Request Message containing a explicit route TLV determines the next hop for this path. Selection of this next hop may involve a selection from a set of possible alternatives. Each node along the path makes a best effort attempt to determine a loop-free path.

To determine the next hop for the path, a node performs the following steps;

1) The node receiving the Label Request Message evaluates the first ER-Hop. If the L bit is not set in the first ER-Hop and if the node is not part of the abstract node described by the first ER-Hop, it has received the message in error, and returns a "Bad initial ER-Hop" error. If the L bit is set and the local node is not part of the abstract node described by the first ER-Hop, the node selects a next hop that is along the path to the abstract node described by the first ER-Hop.

If there is no first ER-Hop, the message is also in error and the system returns a "Bad Explicit Routing TLV" error.

2) If there is no second ER-Hop, this indicates the end of the explicit route and, consequently, the explicit route TLV is removed from the Label Request Message. This node may or may not be the end of the LSP. The process continues by adding ER-Hops, as necessary, to the explicit route TLV according to step 3.

3) After selecting a next hop, the node may alter the explicit route in the following ways. If the explicit route TLV is removed, the node may add a new explicit route TLV. Otherwise, if the node is a member of the abstract node for the first ER-Hop, then a series of ER-Hops may be inserted before the first ER-Hop or may replace the first ER-Hop. Each ER-Hop in this series must denote an abstract node that is a subset of the current abstract node. Alternately, if the first ER-Hop is a loose ER-Hop, an arbitrary series of ER-Hops may be inserted prior to the first ER-Hop.

4) If the node is also a part of the abstract node described by the second ER-Hop, then the node deletes the first ER-Hop and continues processing with step 3, above. Note that this makes the second ER-Hop into the first ER-Hop of the next iteration.

5) The node determines if it is topologically adjacent to the abstract node described by the second ER-Hop. If so, the node selects a particular next hop which is a member of the abstract node. The node then deletes the first ER-Hop and continues processing, as described in step 2.

6) Next, the node selects a next hop within the abstract node of the first ER-Hop that is along the path to the abstract node of the second ER-Hop. If no such path exists then there are two cases:

7) If the second ER-Hop is a strict ER-Hop, then there is an error and the node should return a "Bad strict node" error.

8) Otherwise, if the second ER-Hop is a loose ER-Hop, then the node selects any next hop that is along the path to the next abstract node. If no path exists within the MPLS domain, then there is an error, and the node should return a "Bad loose node" error.

9) Finally, the node replaces the first ER-Hop with any ER-Hop that denotes an abstract node containing the next hop. This is necessary so that when the explicit route is received by the next hop, it will be accepted.

10) Progress the Label Request Message to the next hop.

Returning to the conceptual block diagram of FIG. 1, either of the two illustrative explicit routed label switched paths of FIG. 1 may be established as set forth in the following example. The sample network used here is a four node network with two edge LSRs and two core LSRs as follows:

LSRS------LSRC------LSRD------LSRE

To establish the ERLSP the ingress router, LSRS, generates a Label Request Message, including the ER-TLV, and sends it to LSRC. The ER-TLV is a vector composed of three ER-hop TLVs, corresponding to the S/C, CID, and D/E hops.

LSRC processes the ER-TLV as follows:

1) The first hop <S/C> is part of the abstract node LSRC. Therefore, the first step passes the test. Go to step 2.

2) There is a second ER-Hop, <C/D>. Go to step 3.

3) LSRC is not part of the abstract node described by the second ER-Hop <C/D>. Go to Step 4.

4) LSRC determines that it is topologically adjacent to the abstract node described by the second ER-Hop <C/D>. LSRC selects a next hop to the abstract node LSRD and deletes the first ER-hop, S/C, from the ER-TLV. The ER-TLV is updated to <S/C, C/D>

5) At LSRC, the following processing of takes place:

Since the ER-TLV was not removed, LSRC is not a member of the abstract node described by the first ER-Hop <SIC>, and the first ER-Hop <S/C> is a strict hop, new hops are not inserted. The selection of the next hop has been already done in step 4 and the processing of the ER-TLV is completed at LSRC. In this case, the Label Request Message including the ER-TLV <S/C, C/D> is passed by LSRC to LSRD. The process continues in a similar fashion at LSRD, with the incoming ER-TLV =<S/C, C/D> and the outgoing ER-TLV <D/E>.

At LSRE, the process proceeds, as follows:

1) The first hop <D/E> is part of the abstract node LSRE. Therefore, the first step passes the test and the process proceeds to step 2.

2) There is no second ER-Hop, this indicates the end of the CRLSP. The ER-TLV is removed from the Label Request Message and, consequently, the LSRE does not add a new ER-TLV and no new ER-hops are inserted, indicating the end of the CRLSP. Since LSRE is the egress router and an upstream mapping has been requested, as indicated by the absence of a second ER-hop in the incoming ER-TLV. Therefore, a Label Mapping Message is generated by LSRE and sent to LSRD. Since LSRD received a mapping from its downstream next hop, LSRE, for a CRLSP for which an upstream request is still pending, LSRD generates and sends a Label Mapping Message to LSRC. The process continues at LSRC, in a manner similar to that at LSRD, with LSRD generating and sending a Label Mapping Message to LSRS, thereby completing the end-to-end CRLSP setup.

According to the principles of the invention a plurality of Explicit routed label switched paths are established in this manner between the ingress router and the egress router, routers LSRS and LSRE, respectively in the illustrative conceptual block diagram of FIG. 1. The traffic characteristics of a given path include parameters related to peak rate, committed rate, and service granularity. The peak and committed rates define the bandwidth constraints of the path. The service granularity may be employed to specify a constraint on the delay variation a CRLDP MPLS domain may introduce to a path's traffic. Setup and holding priorities may be employed to rank paths and to thereby determine whether a new path may preempt an existing path. An attempt to establish an Explicitly Routed LSP may fail for a variety of reasons and each such failure is classified as an advisory condition that is signaled by a Notification Message. A CRLSP may be cleared through use of Label Release and Label Withdraw messages.

Figure 2:
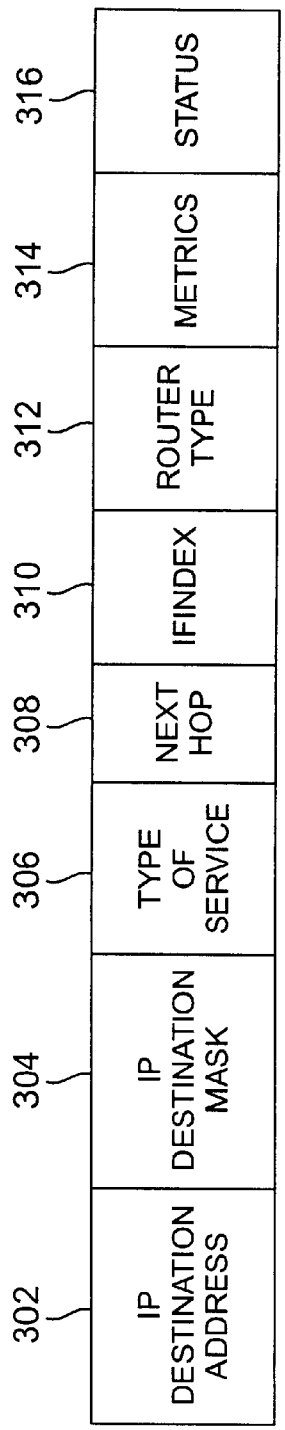
FIG. 2 is a conceptual block diagram of a conventional IP forwarding table.
Figure 3:
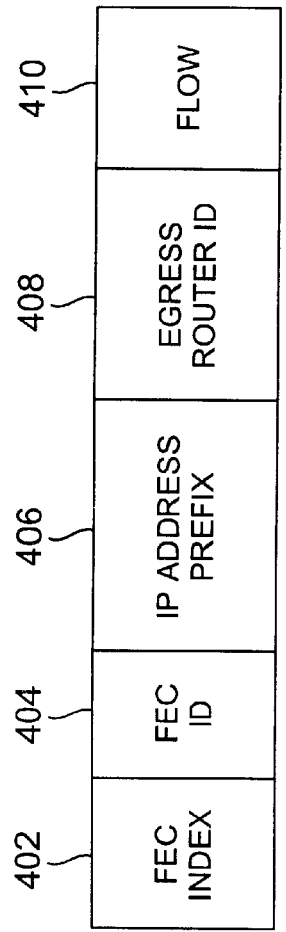
FIG. 3 is a conceptual block diagram of a conventional table depicting the mapping between FEC and labels.
Figures 4, 5:
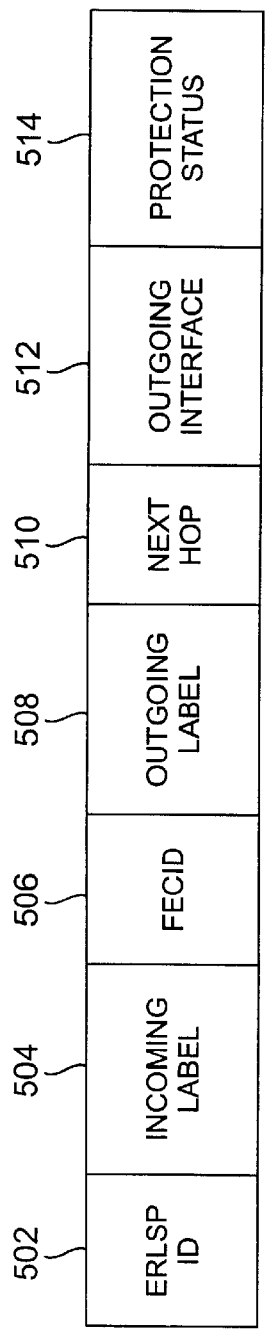
FIG. 4 is a conceptual block diagram of a label information base table in accordance with the principles of the present invention.
FIG. 5 is a conceptual block diagram of a label information base table in accordance with the principles of the present invention, with the various values corresponding to the label switched routers of FIG. 1.

As previously noted, in accordance with the principles of the invention, the ingress router combines the contents of an IP forwarding table with forwarding equivalence class-to-label mappings to produce a label information base in accordance with the principles of the present invention. The label information base may be organized, for example, into a label information base table. The forwarding equivalence class to next hop mapping table may be produced by network layer routing protocols such as Open Shortest Path First (OSPF) or Border Gateway Protocol (BGP). FIGS. 2, 3, and 4 are conceptual block diagrams which illustrates the contents, respectively, of an IP forwarding table, a table containing the mappings between FEC and labels, and a label information base, which is a combination of information gleaned from the prior two tables.

The table of FIG. 2, a product of OSPF, includes an IP destination prefix 302, an IP destination mask 304, the type of service 306, the next hop identifier 308, an IFINDEX 310, router type 312, metrics 314, and a status block 316. The IP destination prefix, as is known in the art, is a destination prefix, such as 128.3/16, for example, that is recognized as indicating that the value of the first sixteen bits of a destination address 128.3. The IP destination mask 304 is used to obtain the effective bits from the destination address field of a packet, such as 255.255.0.0 which may be employed to select the first sixteen bits of a given IP destination address. The type of service (TOS) field 306 provides quality of service information. The Next Hop field 308 indicates the IP address of the next router along the way to a packet's final destination. The IFINDEX field 310 indicates which egress link from the current router should be employed to reach the next hop router. The router type field 312 indicates whether the router is an internal router, an area border router, a backbone router, or an AS boundary router. Because OSPF is based on a shortest path first algorithm, the metrics block field 314 is used to provision the weight of the associated egress link. The status field 316 indicates whether the associated link is up or down, that is, whether the link is operating or not.

The table of FIG. 3 includes a forwarding equivalency class (FEC) index 402, a field equivalency class identifier 404, an Internet protocol address prefix 406, an egress router identifier 408, and a flow block 410. The FEC index 402 field includes the MIB index for the corresponding FEC. The FEC ID field 404 uniquely identifies the FEC, and the IP address prefix field 406 is the same as the IP address prefix field of FIG. 2. The Egress link ID field 408 is the identical to the IFINDEX field 310 of FIG. 2, and the flow field 410 includes attributes of the flow, such as the source/destination address, and source/destination port information.

The table of FIG. 4 depicts a label information base. The label information base, in accordance with the principles of the present invention, is created from information contained within the IP forwarding table of FIG. 2 and the FEC table of FIG. 3. The label information base includes an ERLSP ID 502, which provides a unique ID for the associated flow. An incoming label 504, forwarding equivalence class identifier 506, outgoing label 508, next hop 510, outgoing interface 512 and protection status 514 are also included. The incoming label field 504 contains an ingress label for the label switched path. The FEC ID field 506 contains the same information as the FEC ID field 404 of FIG. 3. The outgoing label field 508 contains the egress label for the label switched path. The next hop field 510 and outgoing interface field 512 contain the same information as their respective counterparts, that is, the Next Hop and IFINDEX fields of the IP forwarding table of FIG. 2. The protection status may take on a value of 0, 1, 2, or 3, respectively corresponding to "unprotected", "protected", "active", and "backup", statuses, with "unprotected" meaning that the flow simply is not equipped for protection flow. The outgoing interface 512 indicates the physical port through which flow will proceed.

The table of FIG. 5 is a label information base table in accordance with the principles of the present invention, which may be employed to establish and provision the two ERLSPs provisioned for flow 192.6/16 between LSRS and LSRE illustrated in FIG. 1. The FEC ID is deleted from the table for convenience. The protection status column will be processed by hardware at the ingress interface, that is, at LSR S, and those flows with a protection status of 3 will be filtered, that is, dropped, at the sink router. During normal operation datagrams will flow through both the S-A-B-E and S-C-D-E ERLSPs, with the egress router, LSR E employing active protection switching to select one of the flows to pass through. Should a fault occur in one of the links along the primary ERLSP, LSRs will detect the broken link through physical layer fault detection mechanisms. In a SONET implementation, for example, such as SONET fault indicators as loss of signal (LOS), loss of frame (LOF), loss of pointer (LOP) or other such physical layer fault indicators may be employed to detect a broken link in an ERLSP. By employing such physical layer fault indicators, a MPLS system in accordance with the principles of the present invention may detect a fault almost instantaneously. Physical layer fault indicators are known and described, for example in Bellcore GR253 R5–198, R6–152, O6–120, and O6–127 which are hereby incorporated by reference. If, for example, the link between LSRA and LSRB of FIG. 1 should fail, receivers at both LSRA and LSRB will detect the broken link. In response to this detection, LSRA will generate a "Downstream Lost" status message, and LSRB will generate an "Upstream Lost" status message. In response to receiving such status messages, both LSRA and LSRB will remain in the "established state", release related label resources, and separately propagate Nak messages upstream and downstream. The "established" state is discussed in ietf draft MLPS documents, a list of which may be accessed at http://www.ietf.org/ietf/lid-abstracts.txt, all of which are hereby incorporated by reference.

Eventually, ingress router LSRS and egress router LSRE will receive Nak messages for the S-A-B-E ERLSP. The ingress and egress routers will respond according to the state machine set forth in the ietf MPLS document listed above, except that, the egress node, will determine whether the failed ERLSP is protected. If it is protected, the LSR will change the protection status of the failed ERLSP from b 3to 0. By modifying the protection status, changing the protection status of the ERLSP from "backup" to "unprotected", the egress LSR completes the hardware protection switching, such as SONET protection switching, since the hardware protection switching relies upon the protection status of a given link to switch. At the ingress router, also referred to as a source node, LSRS will proceed according to the state machine set forth in the ietf MPLS document listed above and, additionally, will determine whether the failed link involves a protected ERLSP. If the ERLSP was protected, the LSRS will change the protection status of the ERLSP from 1 to 0. That is, at this stage, the protected flow, also referred to as the backup or secondary flow, is used as the active flow but another disjoint flow has not yet been established to protect this newly established primary flow. Consequently, the newly established (by virtue of the sink router's selection) primary flow is unprotected, and its status indication is updated from protected (1) to unprotected (0). Additionally the alarm is reported to the network management system.

As a result of the above processing, the label information table will be updated as set forth in the table of FIG. 6. As previously described, a router in accordance with the principles of the present invention employs physical layer fault detection, such as might be supplied in a SONET/SDH system to immediately detect faults. Flow based propagation of these faults, for example, Nak propagation through provisioned flow provides a rapid indication of the faults, and, because duplicate paths have been established, a sink router may select a backup or secondary path as soon as the fault is detected and propagated.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in software implementations, using the appropriate object or processor instructions, or in hybrid implementations which utilize a combination of hardware logic, software logic and/or firmware to achieve the same results. The specific configuration of logic and/or instructions utilized to achieve a particular function, as well as other modifications to the inventive concept are intended to be covered by the appended claims. The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A muter comprising:
   a first port through which datagrams for a given flow may be received from a primary path that originates at an ingress router;
   a second port through which datagrams for the flow may be received from at least one secondary path contemporaneously with the reception at said first port, said at least one secondary path at least partially distinct from the primary path but originating at the same ingress router; and
   a controller for preferentially selecting datagrams received via said first port, said controller comprising a memory for program instructions, and a processor for executing said instructions to configure the router perform the steps of:
      establishing the primary path for the given flow be en the ingress router and an egress router;
      establishing said at least one secondary path for a given flow between the ingress muter and the egress router;
      in response to a failure in the primary path, automatically selecting an operational one of said at least one secondary path for primary communication between the ingress muter and the egress router; and
      in response to the selection of said secondary path, automatically establishing at least one replacement secondary, at least partially distinct, path.

2. The router of claim 1 wherein the controller designates the port from which it selects datagrams for routing as the routers primary port for the given flow and the second port as its secondary port.

3. The router of claim 2 wherein the controller is responsive to physical level maintenance information that indicates a failure in the path associated with the primary port by selecting datagrams from the secondary port or routing.

4. The router of claim 3 wherein the controller is further responsive to physical level maintenance information by employing provisioned flow to propagate alarms.

5. The router of claim 4 wherein the controller is further responsive to physical level maintenance information that indicates a failure in the primary path by designating the secondary path as the primary path and by a playing the propagation of alarms to establish one or more new secondary paths.

6. The router of claim 5 wherein the physical level maintenance information is SONET physical level maintenance information.

7. The router of claim 6 wherein the controller is responsive to SONET loss of signal physical level maintenance information by selecting datagrams from the secondary port for routing.

8. The router of claim 5 wherein the physical level maintenance information is SDH physical level maintenance information.

9. The router of claim 1 wherein the controller is configured to monitor physical level maintenance information.

10. An Internet protocol communications a stem comprising:
    an ingress router;
    an egress router, and
    a plurality of explicitly routed label switched paths contemporaneously carrying like datagrams, and established for single flow between the ingress router and the egress router, wherein the ingress router, the egress router, and any intermediate routers comprise:
       a first port through which datagrams for a given flow may be received from a primary path that originates at the ingress router;
       a second port through which datagrams for the flow may be received from at least one secondary path contemporaneously with the reception at said first port, said at least one secondary path at least partially distinct from the primary path but originating at the same ingress router; and
       a controller for preferentially selecting datagrams received via said first port, said controller comprising a memory for program instructions, and a processor for executing said instructions to configure the router to perform the steps of:
          establishing the primary path for the given flow between the ingress router and the egress router;
          establishing said at least one seconds path for a given flow between the ingress muter and the egress router;
          in response to a failure in the primary path, automatically selecting an operational one of said at least one secondary paths for primary communication between the ingress router and the egress router; and in response to the selection of said as secondary path, automatically establishing at least one replacement secondary, at least partially distinct, path.

11. The system of claim 10 wherein the controller designates the port from which it selects datagrams for routing as the router's primary port for the given flow and the second port as its secondary port.

12. The system of claim 11 wherein the controller is figured to monitor physical level maintenance information.

13. The system of claim 11 wherein the controller is responsive to physical level maintenance information that indicates a failure in the a path associated with the primary port by selecting datagrams from the secondary port for routing.

14. The system of claim 13 wherein the controller is fu her responsive to physical level maintenance information by employing provisioned flow to propagating alarms.

15. The system of claim 14 wherein the controller is further responsive to physical level maintenance information that indicates a failure in the primary path by designating the secondary path as the primary path and by employing the propagation of alarms to establish one or more new secondary paths.

16. The system of claim 15 wherein the physical level maintenance information is SONET physical level maintenance information.

17. The system of claim 16 wherein the controller is responsive to SONET loss of signal physical level maintenance information by selecting datagrams from the secondary port for routing.

18. The system of claim 15 wherein the physical level maintenance information is SDH physical level maintenance information.

19. A method of communicating datagrams through an Internet protocol network comprising the steps of:

for each router, establishing a primary explicitly routed label switched path for a given data flow between an ingress router and an egress router;

for each router, establishing at least one secondary, at least partially distinct, explicitly routed label switched path for a given data flow between the ingress router and the egress router, such that the data flow from said at least one secondary, at least partially distinct, explicitly routed label switched path is received by a second port of the egress router contemporaneously with the reception of the data flow from said primary explicitly routed label switched path at a first port of the egress router;

in response to a failure in the primary explicitly rout label switched path of any one or more of said routers, automatically selecting an operational one of said at least one secondary explicitly routed label switched paths, for each of the tailed routers, for primary communication between the ingress router and the egress router; and in response to the selection of said secondary explicitly routed label switched paths, automatically establishing at least one replacement secondary, at least partially distinct, explicitly routed label switched path.

20. The method of claim 19 further comprising the step of monitoring physical level maintenance information related to the path from which datagrams are selected for routing.

21. The method of claim 20 further comprising the step of selecting datagrams for routing at the egress muter from another of the explicitly routed label switched paths should physical level maintenance information related to the path from which datagrams were originally selected indicate a failure in that path.

22. The method of claim 21 further comprising the step of employing provisioned flow to propagate alarms in response to such a failure.

23. The method of claim 19, further comprising the step of:

in response to failure to automatically establish at least on replacement secondary, at least partially distinct, routed label switched path, generating an alarm indicative of said failure.

* * * * *

UNITED STATES PATENT AND TRADEMARK OFFICE
CERTIFICATE OF CORRECTION

PATENT NO. : 6,721,269 B2
APPLICATION NO. : 09/318694
DATED : April 13, 2004
INVENTOR(S) : Yang Cao, William M. Buchanan and Stephen George Lefoley It is certified that error appears in the above-identified patent and that said Letters Patent is hereby corrected as shown below:

In the claims:

Claim 1, Column 11, Line 42: Delete "muter" and insert --router--

Claim 1, Column 11, Line 55: After "router" insert --to--

Claim 1, Column 11, Line 57: Delete "be en" and insert --between--

Claim 1, Column 11, Line 60: Delete "muter" and insert --router--

Claim 1, Column 11, Line 64: Delete "muter" and insert --router--

Claim 2, Column 12, Line 6: Delete "routers" and insert --router's--

Claim 3, Column 12, Line 11: Delete "or" and insert --for--

Claim 5, Column 12, Line 18: Delete "a playing" and insert --employing--

Claim 10, Column 12, Line 33: Delete "a stem" and insert --system--

Claim 10, Column 12, Line 39: After "for" insert --a--

Claim 10, Column 12, Line 58: Delete "seconds" and insert --secondary--

Claim 10, Column 12, Line 59: Delete "muter" and insert --router--

Claim 10, Column 13, Line 1: After "said" delete "as"

Claim 12, Column 13, Line 9: Delete "figured" and insert --configured--

Signed and Sealed this
Tenth Day of November, 2015

Michelle K. Lee
*Director of the United States Patent and Trademark Office*

CERTIFICATE OF CORRECTION (continued)
U.S. Pat. No. 6,721,269 B2

In the claims:

Claim 13, Column 13, Line 12: After "failure in the" delete "a"

Claim 14, Column 13, Line 15: Delete "fu her" and insert --further--

Claim 19, Column 14, Line 10: Delete "rout" and insert --routed--

Claim 19, Column 14, Line 14: Delete "tailed" and insert --failed--

Claim 21, Column 14, Line 25: Delete "muter" and insert --router--

Claim 23, Column 14, Line 35: Delete "on" and insert --one--